(12) United States Patent
Castillo et al.

(10) Patent No.: US 11,574,440 B2
(45) Date of Patent: **\*Feb. 7, 2023**

(54) REAL-TIME PROCESSING OF CAPTURED BUILDING IMAGERY

(71) Applicant: Hover Inc., San Francisco, CA (US)

(72) Inventors: William Castillo, Redwood City, CA (US); Manish Upendran, San Francisco, CA (US); Ajay Mishra, Palo Alto, CA (US); Adam J. Altman, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/197,924

(22) Filed: Mar. 10, 2021

(65) Prior Publication Data

US 2021/0192842 A1 Jun. 24, 2021

Related U.S. Application Data

(63) Continuation of application No. 16/683,168, filed on Nov. 13, 2019, now Pat. No. 10,991,158, which is a
(Continued)

(51) Int. Cl.
*G06T 17/05* (2011.01)
*G06T 7/00* (2017.01)
*G06T 17/00* (2006.01)

(52) U.S. Cl.
CPC ............ *G06T 17/05* (2013.01); *G06T 7/0002* (2013.01); *G06T 17/00* (2013.01); *G06T 2207/30168* (2013.01)

(58) Field of Classification Search
CPC ....... G06T 17/05; G06T 7/0002; G06T 17/00; G06T 2207/30168
See application file for complete search history.

(56) References Cited

U.S. PATENT DOCUMENTS

| | | | |
|---|---|---|---|
| 5,973,697 | A | 10/1999 | Berry et al. |
| 6,407,777 | B1 | 6/2002 | Deluca |

(Continued)

FOREIGN PATENT DOCUMENTS

| | | |
|---|---|---|
| WO | 2007147830 A1 | 12/2007 |
| WO | 2011079241 A1 | 6/2011 |
| WO | 2011091552 A1 | 8/2011 |

OTHER PUBLICATIONS

Abdul Hasanulhakeem1; A tool to measure dimensions of buildings in various scales for Google Earth Plug-ins and 3D maps; Aug. 6, 2010; pp. 1-2 downloaded from internet: [https://groups.google.com/forum/#!topic/google-earth-browser-plugin/frlvZQ-m38I].
(Continued)

*Primary Examiner* — Said Broome (57) ABSTRACT

Systems and methods are disclosed for guiding image capture of a subject by determining a location of the subject and presenting on a display graphical guides representative of perspective views of the subject to be captured. Images of the subject may then be captured and additional graphical guides are presented to the user for display for additional images to be captured. Images may be captured in a predetermined sequence of graphical guides or responsive to a user input or camera information. Captured images may be uploaded to a system for additional processing.

20 Claims, 10 Drawing Sheets

Related U.S. Application Data continuation of application No. 16/555,070, filed on Aug. 29, 2019, now Pat. No. 10,713,842, which is a continuation of application No. 15/942,733, filed on Apr. 2, 2018, now Pat. No. 10,410,412, which is a continuation-in-part of application No. 15/166,587, filed on May 27, 2016, now Pat. No. 9,934,608.

(60) Provisional application No. 62/168,460, filed on May 29, 2015.

(56) References Cited

U.S. PATENT DOCUMENTS

| | | | |
|---|---|---|---|
| 7,218,318 | B2 | 5/2007 | Shimazu |
| 7,353,114 | B1* | 4/2008 | Rohlf ................... G06F 40/143 702/5 |
| 7,814,436 | B2 | 10/2010 | Schrag et al. |
| 8,040,343 | B2 | 10/2011 | Kikuchi et al. |
| 8,098,899 | B2 | 1/2012 | Ohashi |
| 8,139,111 | B2 | 3/2012 | Oldroyd |
| 8,208,056 | B2 | 6/2012 | Fujio et al. |
| 8,339,394 | B1 | 12/2012 | Lininger |
| 8,350,850 | B2 | 1/2013 | Steedly et al. |
| 8,390,617 | B1 | 3/2013 | Reinhardt |
| 8,749,580 | B1 | 6/2014 | Lininger |
| 9,333,361 | B2 | 5/2016 | Li et al. |
| 9,342,930 | B1 | 5/2016 | Kraft et al. |
| 9,478,031 | B2 | 10/2016 | Bhatawadekar et al. |
| 9,625,612 | B2* | 4/2017 | Brewington ............. G06T 7/73 |
| 9,716,826 | B2 | 7/2017 | Wu et al. |
| 9,721,177 | B2 | 8/2017 | Lee et al. |
| 9,727,834 | B2 | 8/2017 | Reyes |
| 9,961,260 | B2 | 5/2018 | Graham et al. |
| 10,104,282 | B2 | 10/2018 | Graham et al. |
| 2003/0014224 | A1 | 1/2003 | Guo et al. |
| 2003/0052896 | A1 | 3/2003 | Higgins et al. |
| 2004/0196282 | A1 | 10/2004 | Oh |
| 2007/0147826 | A1 | 6/2007 | Matsuzaku et al. |
| 2007/0168153 | A1 | 7/2007 | Minor et al. |
| 2008/0221843 | A1 | 9/2008 | Shenkar et al. |
| 2008/0291217 | A1* | 11/2008 | Vincent .................. G06T 19/00 345/629 |
| 2009/0043504 | A1 | 2/2009 | Bandyopadhyay et al. |
| 2010/0045869 | A1 | 2/2010 | Baseley et al. |
| 2010/0074532 | A1 | 3/2010 | Gordon et al. |
| 2010/0114537 | A1 | 5/2010 | Pershing |
| 2010/0265048 | A1* | 10/2010 | Lu ........................... B60C 9/005 340/435 |
| 2011/0029897 | A1 | 2/2011 | Russell |
| 2011/0181589 | A1 | 7/2011 | Quan et al. |
| 2013/0195362 | A1 | 8/2013 | Janky et al. |
| 2013/0211790 | A1 | 8/2013 | Loveland et al. |
| 2014/0013263 | A1 | 1/2014 | Bailiang et al. |
| 2014/0212028 | A1 | 7/2014 | Ciarcia |
| 2014/0247325 | A1 | 9/2014 | Wu et al. |
| 2014/0369595 | A1 | 12/2014 | Pavlidis et al. |
| 2015/0241172 | A1 | 8/2015 | Roman et al. |
| 2015/0373264 | A1 | 12/2015 | Anzue et al. |
| 2016/0093106 | A1 | 3/2016 | Black |
| 2016/0350969 | A1 | 12/2016 | Castillo et al. |
| 2017/0030363 | A1 | 2/2017 | Hustvedt et al. |

OTHER PUBLICATIONS

Wang, et al.; Large-Scale Urban Modeling by Combining Ground Level Panoramic and Aerial Imagery; IEEE Third International Symposium on 3D Data Processing, Visualization, and Transmission; Jun. 14-16, 2006; pp. 806-813.

Bansal, et al., "Geo-Localization of Street Views with Aerial Image Databases," Nov. 28-Dec. 1, 2011, pp. 1125-1128.

Becker, et al., "Semiautomatic 3-D model extraction from uncalibrated 2-D camera views," MIT Media Laboratory, 15 pages.

Caramba App Development, "EasyMeasure-Measure with your Camera on the App Store on iTunes", https://tunes.apple.com/us/app/easymeasure-measure-measure-your-camera/id349530105mt=8, 2 pages.

Chen, et al., "City-Scale Landmark Identification on Mobile Devices," pp. 737-744.

Fairfax County Virginia, "Virtual Fairfax," http://www.fairfaxcounty.gov/gis/virtualfairfax, 2 pages.

Fruh and Zakhor, "Constructing 3D City Models by Merging Aerial and Ground Views," IEEE Computer Graphics and Applications, Nov./Dec. 2003, pp. 52-61, 10 pages.

Huang and Wu et al., "Towards 3D City Modeling through Combining Ground Level Panoramic and Orthogonal Aerial Imagery," 2011 Workshop on Digital Media and Digital Content Management, pp. 66-71, 6 pages.

Jaynes, "View Alignment of Aerial and Terrestrial Imagery in Urban Environments," Springer-Verlag Berlin Heidelberg 1999, pp. 3-19, 17 pages.

Kroepfl, et al., "Efficiently Locating Photographs in Many Panoramas," Nov. 2-5, 2010, ACM GIS10.

Lee, et al., "Automatic Integration of Facade Textures into 3D Building Models with a Projective Geometry Based Line Clustering," Eurographics 2002, vol. 2, No. 3, 10 pages.

Lee, et al., "Integrating Ground and Aerial Views for Urban Site Modeling," 6 pages.

Pu et al., "Automatic Extraction of Building Features From Terrestrial Laser Scanning," International Institute for Geo-information Science and Earth Observation, 5 pages.

Scale & Area Measurement; http://www.geog.ucsb.edu/~jeff/115a/lectures/scale_and_area_measuremenl.hlml, 8 pages.

Scope Technologies; Solutions; Mar. 4, 2014; pp. 1-2, downloaded from the internet: [http://www.myscopetech.com/solutions.php].

Xiao, et al., "Image-based Facade Modeling," ACM Transaction on Graphics {TOG), 2008, 10 pages.

SketchUp Knowledge Base, Tape Measure Tool: Scaling an entire model, http://help.sketchup.com/en/article/95006, 2013 Trimble Navigation Limited, 2 pages.

* cited by examiner

REAL-TIME PROCESSING OF CAPTURED BUILDING IMAGERY

CROSS REFERENCE TO RELATED PATENTS/PATENT APPLICATIONS

This application is a continuation of pending U.S. patent application Ser. No. 16/683,168, filed Nov. 13, 2019, entitled, "REAL-TIME PROCESSING OF CAPTURED BUILDING IMAGERY", which is a continuation of U.S. patent application Ser. No. 16/555,070, filed Aug. 29, 2019, entitled, "REAL-TIME PROCESSING OF CAPTURED BUILDING IMAGERY," which is a continuation of U.S. patent application Ser. No. 15/942,733, filed Apr. 2, 2018, entitled "REAL-TIME PROCESSING OF CAPTURED BUILDING IMAGERY," and issued as U.S. Pat. No. 10,410,412, which is a continuation-in-part (CIP) of U.S. patent application Ser. No. 15/166,587, filed May 27, 2016, entitled "GRAPHICAL OVERLAY GUIDE FOR INTERFACE," and issued as U.S. Pat. No. 9,934,608, which claims priority to U.S. Provisional Patent Application 62/168,460, entitled "GRAPHICAL OVERLAY GUIDE FOR INTERFACE," filed May 29, 2015. The contents of the aforementioned patent applications are hereby expressly incorporated by reference in their entirety.

BACKGROUND

Technical Field

The technology described herein relates generally to a system and method for creating multi-dimensional building models (e.g., 3D), and in particular, to a system and method for guiding, in real-time, a user through capturing a series of quality building images.

Description of Related Art

Some efforts have been made to generate three-dimensional (3D) textured models of buildings via aerial imagery or specialized camera-equipped vehicles. However, these 3D models have limited texture resolution, geometry quality, accurate geo-referencing and are expensive, time consuming and difficult to update and provide no robust real-time image data analytics for various consumer and commercial use cases.

Disadvantages of conventional approaches will be evident to one skilled in the art when presented in the disclosure that follows.

DETAILED DESCRIPTION

Figure 1:
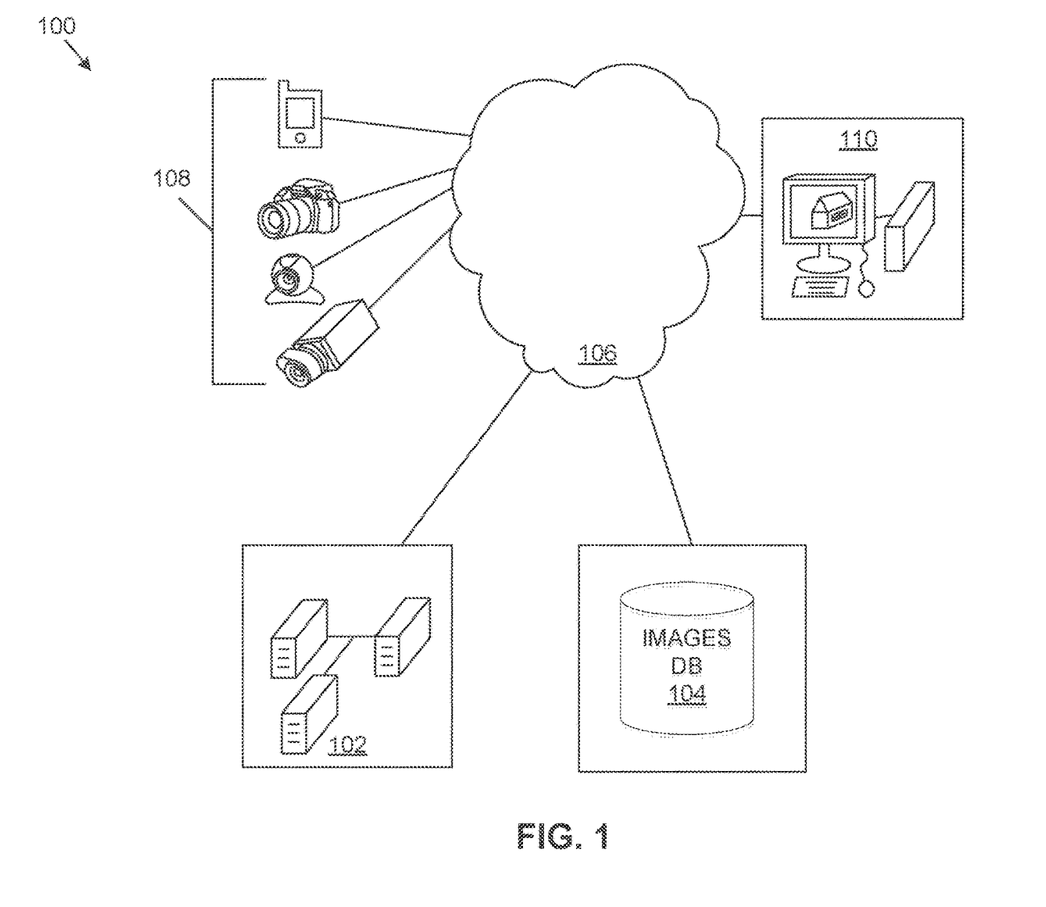
FIG. 1 illustrates one embodiment of a system architecture in accordance with the present disclosure.

FIG. 1 illustrates one embodiment of system architecture in accordance with present disclosure. In one embodiment, image processing system 100 includes image processing servers 102. Images database (DB) 104 and image processing servers 102 are coupled via a network channel 106.

Network channel 106 is a system for communication. Network channel 106 includes, for example, an Ethernet or other wire-based network or a wireless NIC (WNIC) or wireless adapter for communicating with a wireless network, such as a WI-FI network. In other embodiments, network channel 106 includes any suitable network for any suitable communication interface. As an example and not by way of limitation, the network channel 106 can include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, network channel 106 can be a wireless PAN (WPAN) (such as, for example, a BLUETOOTH WPAN), a WI-FI network, a WI-MAX network, a 3G, 4G or 5G network, LTE, a cellular telephone network (such as, for example, a Global System for Mobile Communications (GSM) network).

In one embodiment, network channel 106 uses standard communications technologies and/or protocols. Thus, network channel 106 can include links using technologies such as Ethernet, 802.11, worldwide interoperability for microwave access (WiMAX), 3G, 4G, LTE, CDMA, digital subscriber line (DSL), etc. Similarly, the networking protocols used on network channel 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). In one embodiment, the data exchanged over network channel 106 is represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

In one or more embodiments, image processing servers 102 include suitable hardware/software in the form of circuitry, logic gates, and/or code functions to process ground-level images to include, but not limited to, scaling, calculation of one or more image measurements and constructing a multi-dimensional model (e.g., 3D). Capture device(s) 108 is in communication with image processing servers 102 for collecting images of building objects. Capture devices 108 are defined as electronic devices for capturing images. For example, the capture devices include, but are not limited to: a camera, a phone, a smartphone, a tablet, a video camera, a security camera, a closed-circuit television camera, a computer, a laptop, a webcam, wearable camera devices, photosensitive sensors, IR sensors, lasers, equivalents or any combination thereof.

Image processing system 100 also provides for viewer device 110 that is defined as a display device. For example, viewer device 110 can be a computer with a monitor, a laptop, a touch screen display, a LED array, a mobile phone, a smartphone, a tablet, a television set, a projector display, a wearable heads-up display of some sort, or any combination thereof. In one or more embodiments, the viewer device includes display of one or more building facades and associated measurements, such as, for example, a conventional desktop personal computer having input devices such as a mouse, keyboard, joystick, or other such input devices enabling the input of data and interaction with the displayed images and associated measurements.

In one embodiment, an image processing system is provided for uploading to image processing servers 102 ground-level images of a physical building from a capture device. An uploaded image is, for example, a digital photograph of a physical building, for example, showing a corner with one or more sides of the physical building. Image processing servers construct a 2D/3D building model using the uploaded ground images with known or future 2D/3D model construction methodologies.

Figure 2:
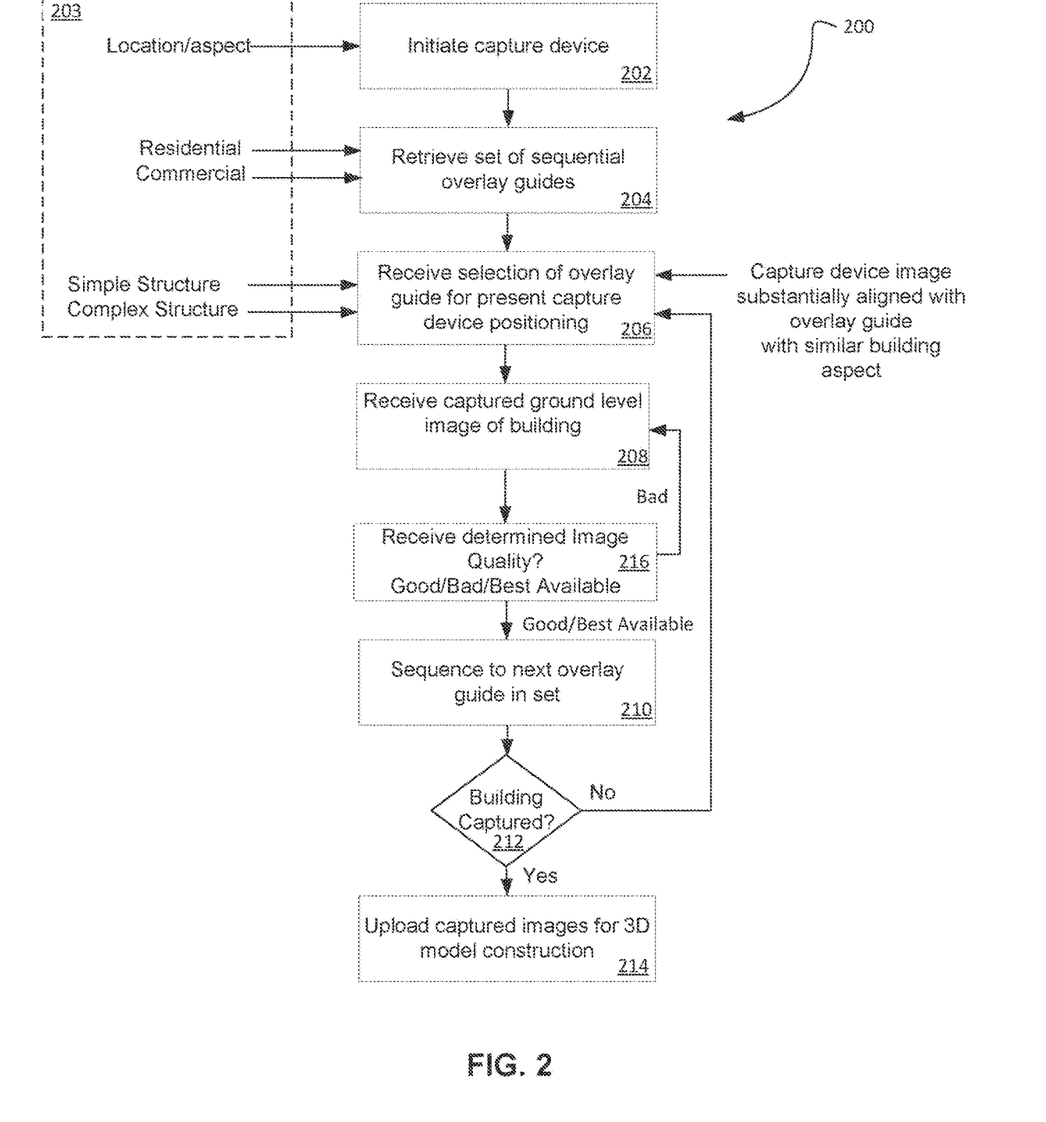
FIG. 2 illustrates a flowchart representing the process for accurately guiding a user to capture images used to create a 3D building model in accordance with the present disclosure.

FIG. 2 illustrates a flowchart representing a process for guiding a user of a capture device 108 (e.g., smartphone) to more accurately capture a series of ground level images of a building. Ground-level images are captured as the picture taker moves around the building—taking a plurality (e.g., 4-16 for an entire building) of ground level images from multiple angles and distances. The series of captured ground level images will be uploaded to both image database 104 and image processing servers 102 to be stored and processed to create the 3D building model and returned to the user.

Process 200 begins in step 202 with initiation of a capture device 108 (e.g., smartphone with camera). Initiation may include one or more of: determining location and/or aspect 203 (i.e., perspective, such as aligned with right corner of building) as further described in association with FIG. 3; determining user information (name, login, account info, etc.); determining if the subject of the ground-level image is a residential or commercial building 203 manually from user selection or automatically from location determination/perspective (e.g., pointing in a specific direction at a determined location); or using real-time image-based computer vision techniques. For example, the user's location can be determined from GPS or user entry of an address. Using sensors of the capture device (e.g., pitch, yaw and roll axis), a determination can be made as to which surrounding building is the subject of the capture (i.e., facing a specific building on the south side of the street at a specific location). In one embodiment, image-based algorithms identify building features in real-time that confirm or reinforce expected building type assumptions. For example, at a known location, a two-story structure with gable roof is expected.

Figure 6A:
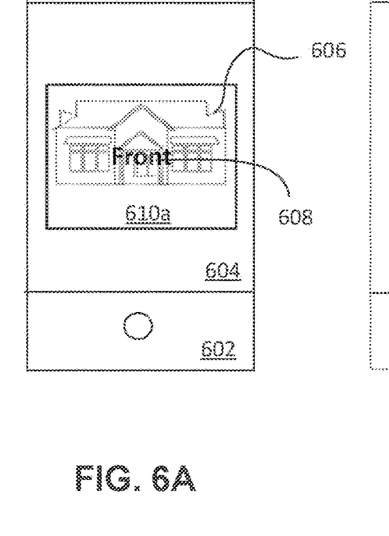
FIGS. 6A-6F, collectively, illustrate a set of guide overlays in accordance with the present disclosure.
Figure 6B:
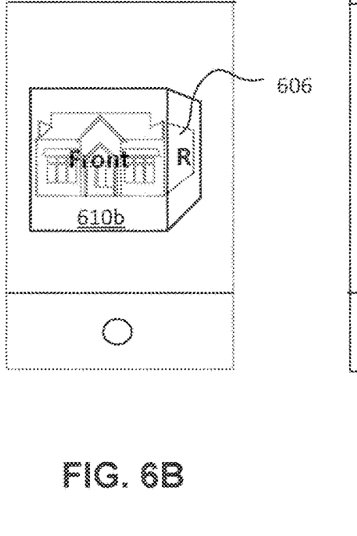

In step 204, a first overlay from a set of sequential graphical overlay guides is retrieved for display on capture device 108. For example, a first overlay guide illustrating a 3D perspective graphic can be a front/right guide as shown in FIG. 6B. The front/right overlaid guide includes a 3D perspective front image facade, right corner edge and partial right-side facade of a building and, in one embodiment, is displayed as a semi-transparent graphic (i.e., can see through). Other graphical overlays, including 2D, may be used without departing from the scope of the present disclosure. The graphical overlay guides are not used to assist in focusing the camera. In step 206, the system receives a selection of which overlay guide best matches the present perspective of the capture device (manually from the user or automatically based on location/perspective/other image processing and/or computer vision algorithms running in near-real time on the image capture device as is known in the art). Optional selections 203, such as simple (one-story) or complex structure (two-story, multiple sections, etc.), may assist in generating an appropriate set of specific overlay guides. For example, if the user is right of center facing a simple structure building, an example front/right overlay guide would be best. While the system will automatically determine perspective based on visual cues in the camera image (still or video sequence), if the user is not aligned with the appropriate guide of the building, they can sequence through the set of overlay guides until arriving at the appropriate overlay guide for their position/perspective. In an alternative embodiment, a corresponding 3D overlay is automatically selected to match a capture device detected orientation of the subject building. In an alternative embodiment, a user is prompted to start with a specific overlay (e.g., front).

In step 208, using the overlay guide as an alignment tool, the capture device camera image is substantially aligned (perfect alignment not required) with the overlay guide. Typically, the user would have on their display an image as seen, for example, from their smartphone camera viewfinder and thereafter align the corner of the building in the display with the corner in the overlay guide (see FIG. 6B). Vertical alignment is also possible using the upper/lower edges of side panes of the overlay guide. Once aligned, a picture is taken (captured) and the process recognizes (associates) that a captured image (photo) of the building from the selected overlay guide is taken. The picture can be taken manually by the user or automatically taken when substantially aligned with the overlay guide. In addition, client-side feedback can assist the user, for example, visual indicators such as text prompts or color indicators (green (great), yellow (good), red (bad)); flashing or highlighting, etc. or audio indicators (e.g., "move left", "move right", "up", "down" and "center building").

Visual indicators of image quality are included 216 to determine image quality (Good, Bad or Best Available). Image quality can be determined in real time (e.g., milliseconds) either using onboard software or remotely using server processing (102) and may include historical data (similar image comparison) for refinement or learning capability. The 'best available" option, in one embodiment, is selected manually by the user based on location, distance restrictions, camera restrictions, etc. or automatically based on a number of failures to capture a good image. If the image capture is bad (e.g., left/right/top/bottom boundaries cut off), the user is prompted to either retake the image or select best available.

In step 210, the overlay guide is sequentially advanced (e.g., moving counter-clockwise around the building) guiding the user to a next position to take another image of the building. The process continues in step 212 until the building is fully captured (e.g., four corners). While only one corner image of the building is required to minimally capture building 3D information, the quality, accuracy and completeness of a 3D model of the building created from the images will improve with a greater number and better circumferential distribution (e.g., many sides, corners and perspectives).

In step 214, the captured images are uploaded to image processing servers 102 to create a 3D model. The technology described herein is not limited by the method to produce the 3D building model. In one example embodiment, the images are stored locally in capture device memory for local processing, uploaded in real-time, discreetly or as a group, to images DB 104 or to another computer/server memory for storage before processing in 102. In one example embodiment, the images are uploaded to/from third party image services (e.g., Flickr®, Facebook®, Twitter®, etc. or other mobile apps, such as Zillow®, Craigslist®, etc.) first before being uploaded to image processing servers 102/images DB 104. For another example, the images are transferred first from a camera to a networked computer (e.g., cloud based server system), and then to image processing servers 102/images DB 104. Even though the embodiments are described with remote (server) processing, the entire process of the technology described herein can be performed on the capture device itself.

In one embodiment, key architectural geometric features of the 3D model are identified. Architectural features include, but are not limited to: windows, doors, siding, gutters, vents, roofing, roof intersection vertices, ground intersection vertices, bay window vertices and/or overhanging vertices. Scaled measurements may also, in one embodiment, be included for one or more of the architectural features. In alternative embodiments, the identification of architectural geometric features is performed semi-automatically, manually by a reviewer, or fully automatically. They may be performed in real-time or near real-time on the image capture device, partially on a server or entirely on a server.

Figure 3:
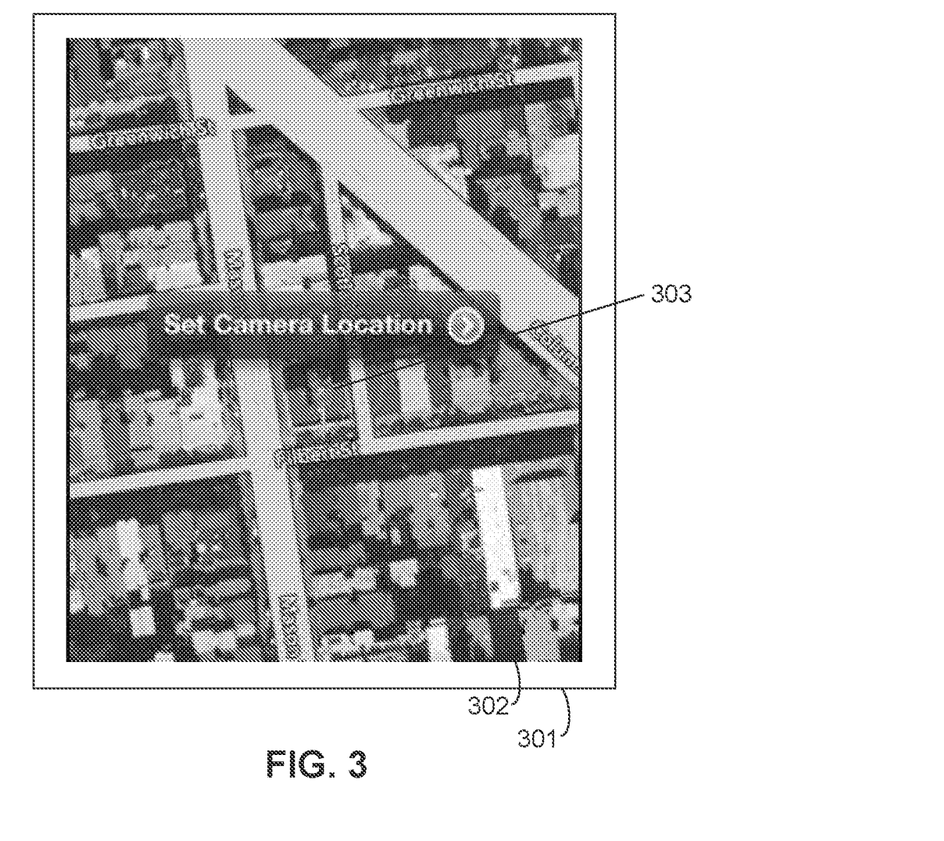
FIG. 3 illustrates a diagram of geo-referencing a building location in accordance with the present disclosure.

FIG. 3 illustrates a diagram of geo-referencing a building location in accordance with the present disclosure (step 202). In one embodiment, capture devices include a global positioning satellite (GPS) system for providing location information. The capture device 301 is used to identify a location using the GPS information of a current location. As shown in FIG. 3, the capture device displays map 302 showing its current location 303. In one embodiment, confirmation of the GPS determined location information is required. In alternative embodiments, the location of a building is determined by manually typing in an address or selecting a point on a map (e.g., 302). In the embodiments disclosed herein, the location of the building is not required to implement the methods described for image capture and/or to create the 3D building model.

Figure 4:
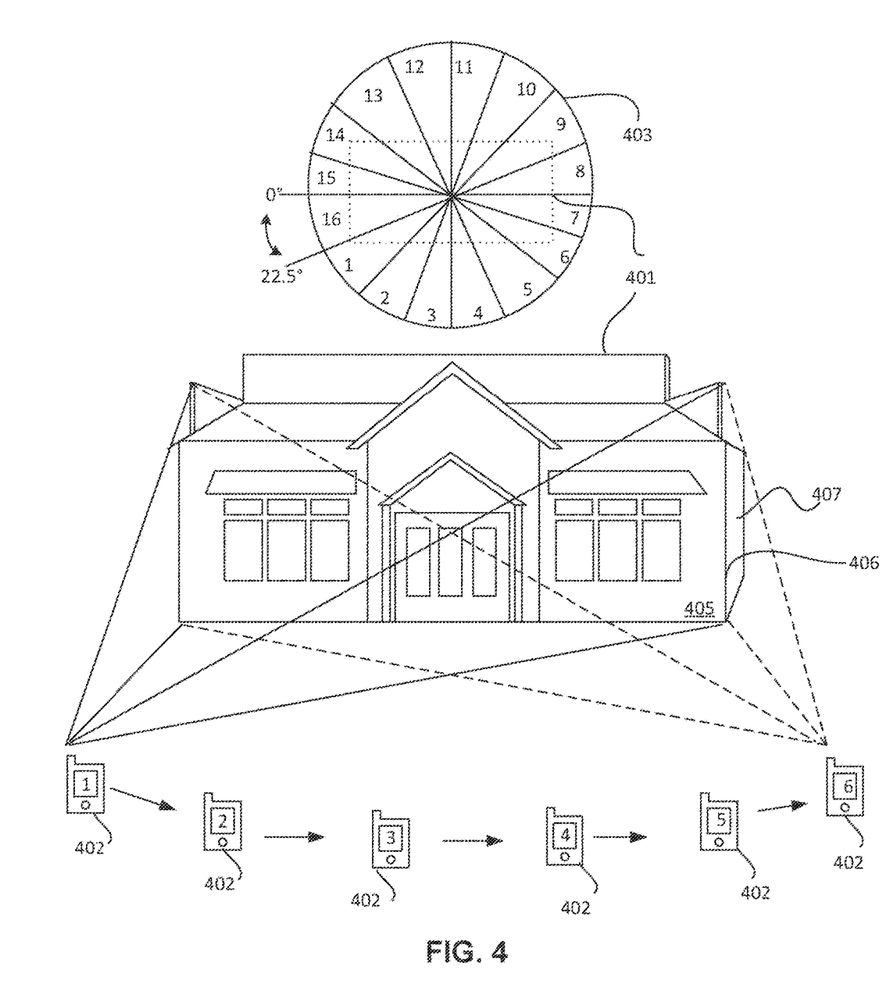
FIG. 4 illustrates a diagram of capturing ground-level images of a building object in accordance with the present disclosure.
Figure 6C:
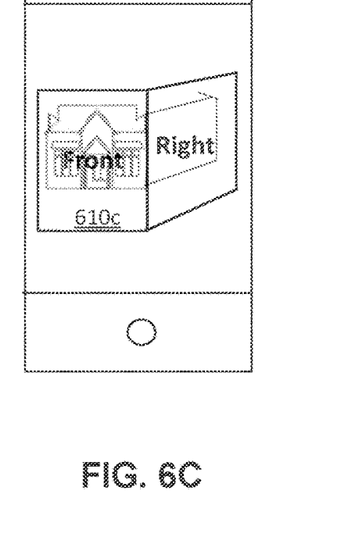
Figure 6D:
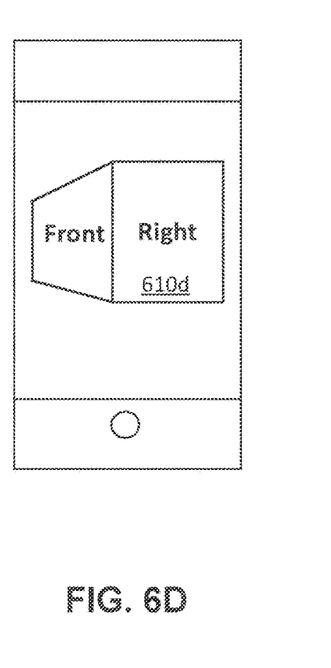
Figure 6E:
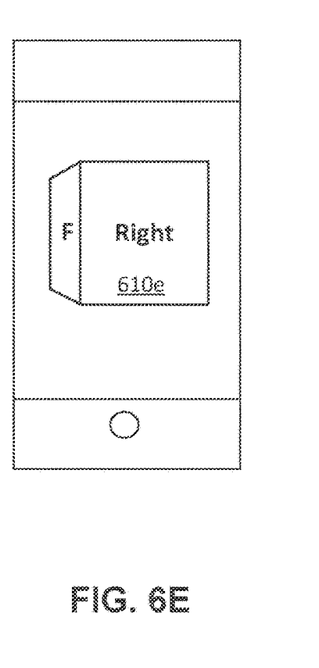
Figure 6F:
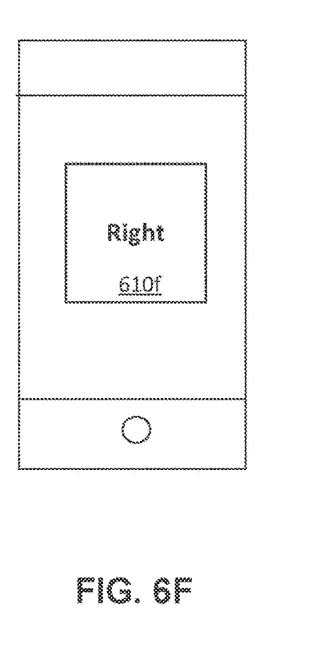

FIG. 4 illustrates a diagram of capturing ground-level images of a building object in accordance with the present disclosure. As shown, a plurality of ground-level images for building object 401 are collected by smartphone 402 (capture device 108). Each ground-level image is taken at a different perspective relative to the other images of the building object. For example, smartphone 402 collects ground-level images at a first position, a second position, a third position, a fourth position and a fifth position (as shown 1, 2, 3, 4, 5). An overhead perspective diagram 403 illustrates picture taking positions 1-6 as correlating left-to-right in the front of the building. The various embodiments of the present disclosure encourage a user to take a plurality of images with a corner and one or more sides visible at various perspectives (angles) circumferentially around the entire building. For example, an image captured from segment 6, would capture a perspective including a front facade 405, right corner 406 and right facade 407 perspective (FIG. 6B). An image captured from segment 7 may equate to FIG. 6C.

Figure 5:
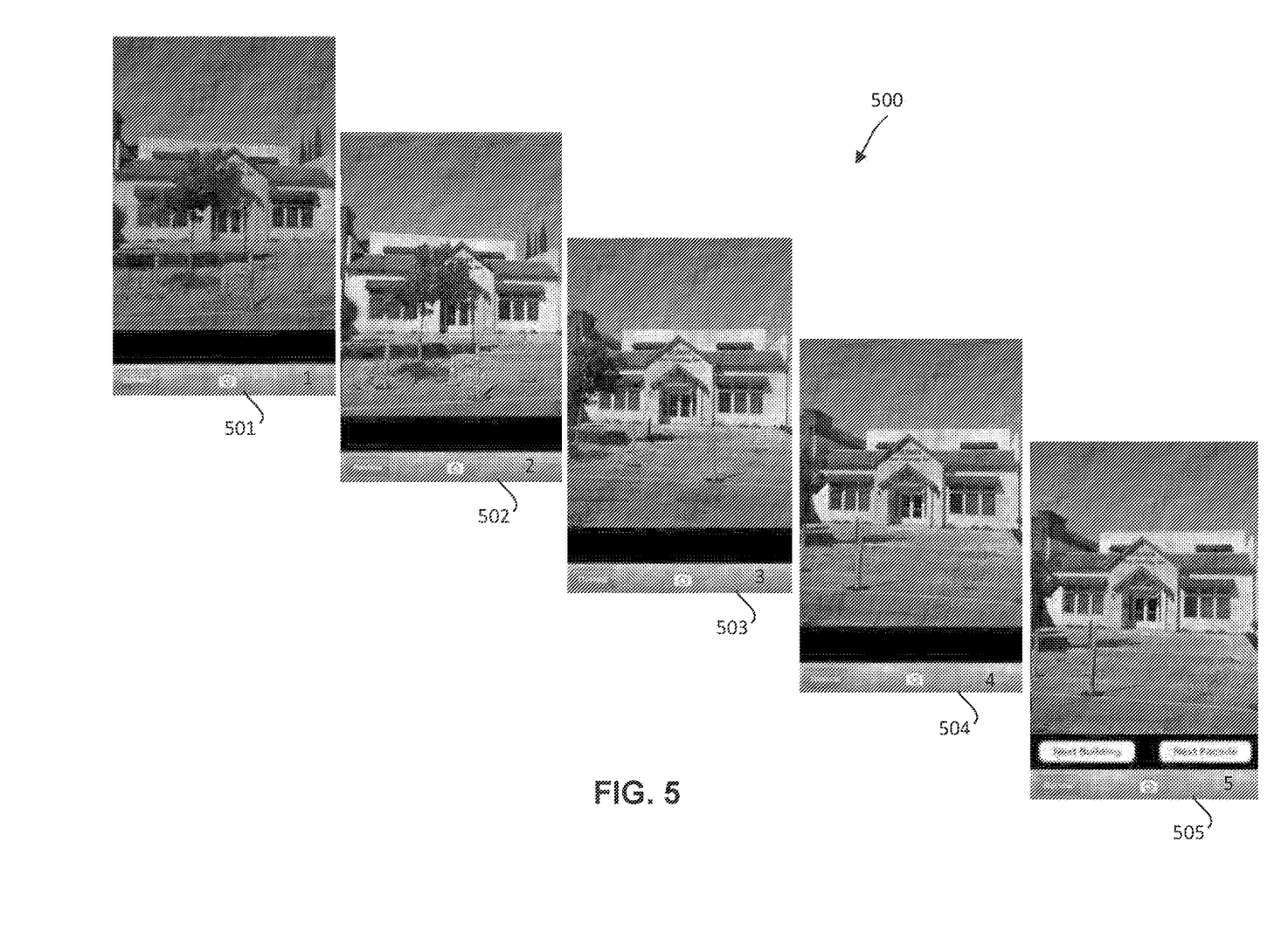
FIG. 5 illustrates an example of collected ground-level images for a façade of a building in accordance with the present disclosure.

FIG. 5 illustrates an example of collected ground-level images for building 401 in accordance with the present disclosure. Ground-level images 500 provide for different perspectives of the building (centered on the façade). Ground-level images 501 to 505 capture the building from five perspectives panning, for example, left-to-right (counter clockwise) the façade of the building. Ground-level image 501 provides for the left most building façade perspective relative to the other ground-level images. Ground-level image 505 provides for the right most building façade perspective relative to the other ground-level images. Ground-level images 502 through 504 represent the building façade from three additional perspectives between ground-level images 501 and 505. While shown as 5 images of the front of the building, the user continues around the building taking photos as suggested by the guide overlays until the building is captured.

FIGS. 6A-6F, collectively, illustrate a set of guide overlays in accordance with the present disclosure. For brevity purposes, the illustrations are limited to six overlays. However, a more complete set would include a plurality of overlay guides to capture the entire building including all sides/corners with various perspectives of the building. For example, a plurality of ground-level images is collected for each visible side and/or corner of the building using the overlay guides. In an alternate example embodiment, when a building is part of a larger collection of buildings (i.e., a townhome, a store in a strip mall, etc.) not all sides of the building are accessible for ground-level images as at least one side is shared with an adjacent building and therefore many of the guides are skipped from the sequential set of graphical guides.

As shown, smartphone 602 includes a display section 604. When a camera of the smartphone is activated for taking a photo, the digital viewfinder shows the subject of the picture (in this case a building of interest 606) in display 604. Overlay guides 610a-610f are sequential counter-clockwise perspectives of the building. The user simply aligns the overlay building guide with the subject building in the display and takes the picture. As previously mentioned, substantially aligning a corner in the subject image displayed with a corner of the overlay guide is typically a good starting point for alignment (but not required). In addition, ensuring that the entire building object is roughly aligned with the orientation of the overlay guide improves quality of capture. As illustrated, the sides are named "Front, Right, Left, or Back" 608 or "F, R, L or B" 606 when perspective space does not allow for the complete wording. Sequencing though the overlay guides prompts a user to sequentially move around the building using, for example, their smartphone in a structured manner to better capture a plurality of images capturing the entire building.

In one embodiment, pixels of the orthogonal image are geo-referenced with accurate spatial representation in the world coordinate system. Geo-referenced orthogonal images therefore include distances between coordinate points. By correlating the ground-level building façade with known geo-referenced orthogonal images, the geo-spatial position of each pixel within the ground-level building façade is determined and can be used to accurately measure various architectural features of the façade. The described embodiments are, for simplicity, described for only a single exterior façade, but can be repeated for any number of facades (sides), including the roof (top) or interior facades/surfaces and are not limited to buildings. However, while described as an embodiment, the technology disclosed herein can be equally performed without orthogonal imagery, aerial and/or satellite imagery to capture the ground level images using the overlay guides and subsequent 3D construction of the 3D building model.

In one embodiment, known standard measurements, for example a height from a door threshold to the center of a door knob is used to scale the 3D building model. The scaling can be used with any known standard measurement or ratio (e.g., known standard width-to-height ratios of standardized building architectural features (e.g., doors, windows, etc.) located within a captured image.

Figure 7:
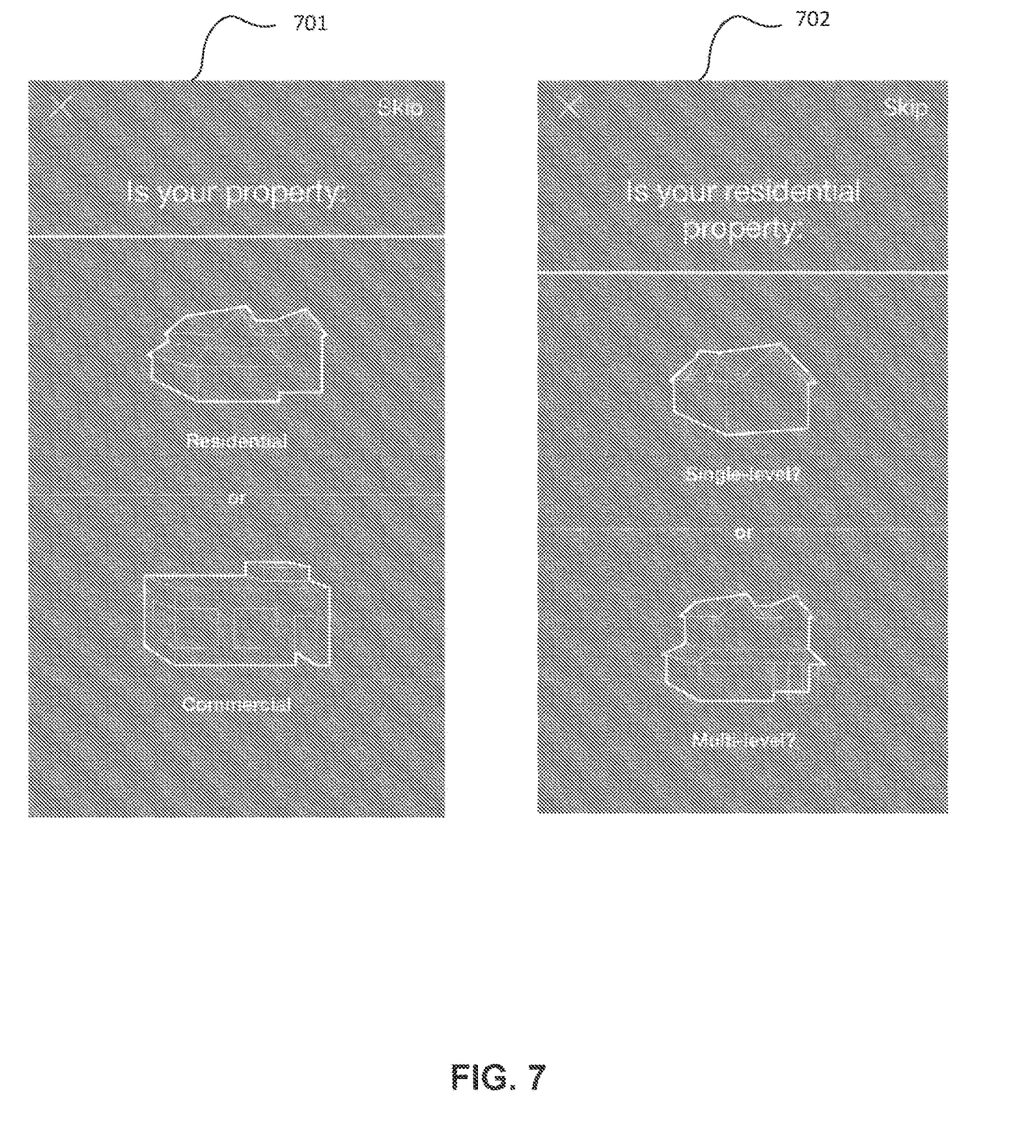
FIG. 7 illustrates one embodiment of graphical set-up selections for accurately initiating selection of building graphical overlays in accordance with the present disclosure.

FIG. 7 illustrates one embodiment of assisting the user in setting up a graphical building overlay selection. In one embodiment, graphical set-up guides include determining user information (name, login, account info, etc.) and/or determining if the subject of the ground level image is a residential or commercial building (manually from user selection 701 or automatically from location determination and perspective). In addition, selections 702, such as simple (one story) or complex structure (two-story, multiple sections, etc.), assist in generating an appropriate set of specific building overlay guides.

Figure 8:
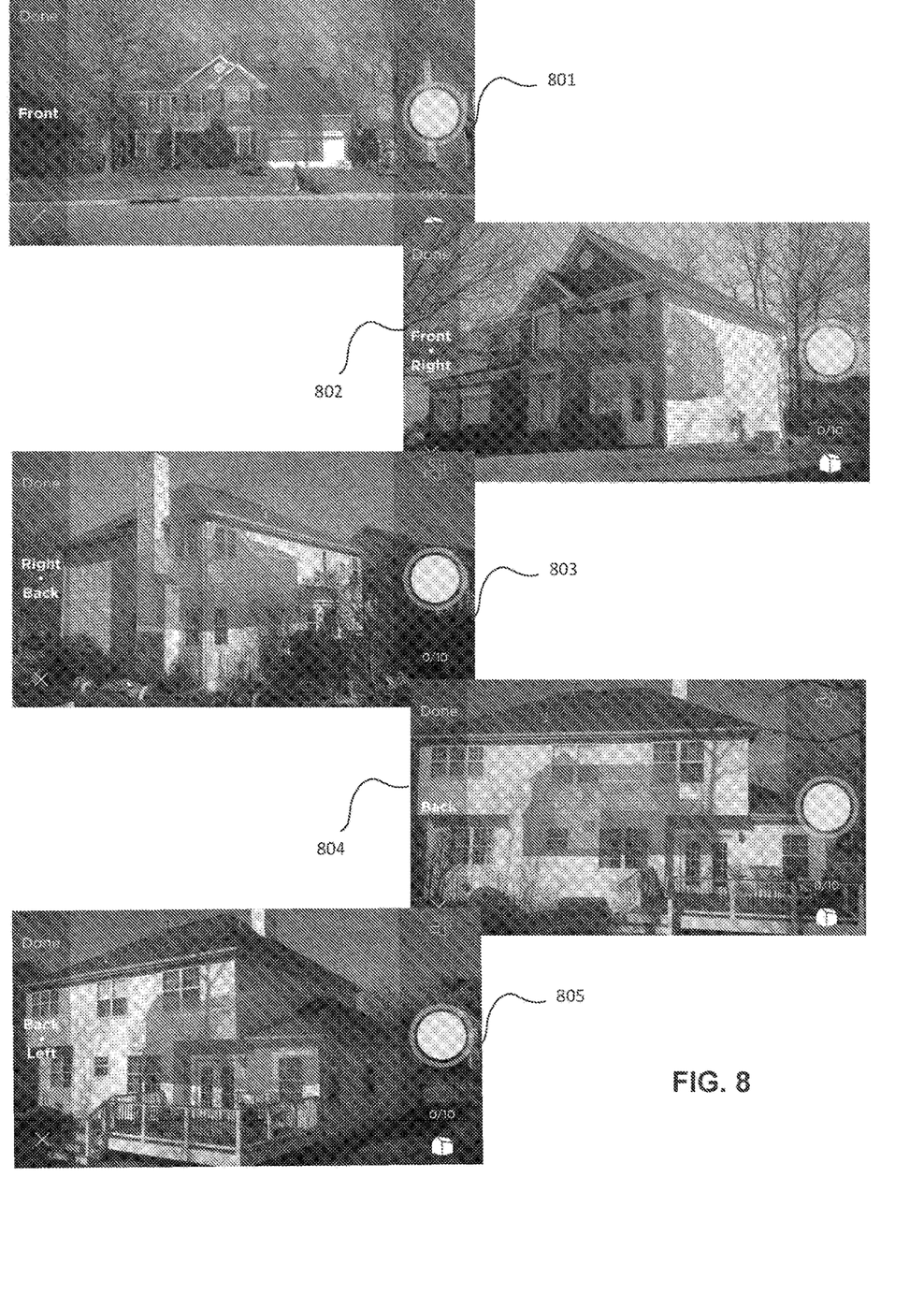
FIG. 8 illustrates an example series of building graphical overlays for a complex residential building in accordance with the present disclosure.

FIG. 8 illustrates one embodiment of assisting a user in taking a series of perspective pictures (ground-level images) of a residential building. Elements 801-805, collectively, illustrate a set of semi-transparent building graphical overlays in accordance with the present disclosure. For brevity purposes, the illustrations are limited to five overlays. However, a more complete set would include a plurality overlay guides to capture the entire building including all sides/corners with various perspectives of the building. Based on a selection of residential and two-stories, a semi-transparent complex two-story 2D/3D building overlay is projected on the user's smartphone (capture device 108). As shown in element 801, a front image as seen through the capture device viewfinder (e.g., screen) is displayed with a front semi-transparent building overlay guide. The user would substantially align (e.g., center and level) the front building image with the corresponding overlay by moving the capture device and take the picture when substantially aligned. Additional sequential overlays are illustrated, such as Front Right 802, Right Back 803, Back 804 and Back Left 805. As illustrated, the semi-transparent complex two-story 2D/3D building overlay each include a perspective to match a perspective of the building in the image viewfinder (e.g., display screen). In an alternative embodiment, using real-time tracking and computer imaging, the perspective of the building overlay can be automatically changed to fit the actual building perspective.

Figure 9:
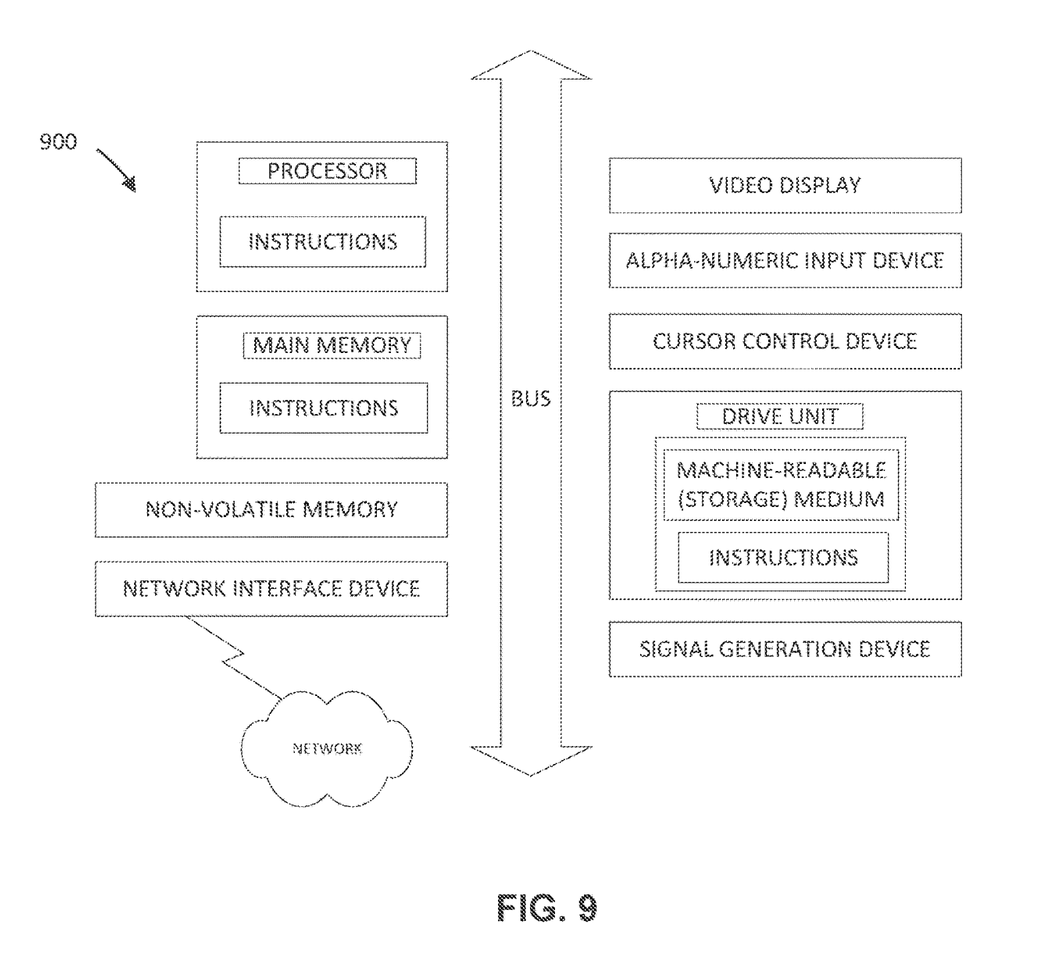
FIG. 9 illustrates a diagrammatic representation of a machine in the example form of a computer system in accordance with the present disclosure.

Referring now to FIG. 9, therein is shown a diagrammatic representation of a machine in the example form of a computer system 900 within which a set of instructions, for causing the machine to perform any one or more of the methodologies or modules discussed herein, may be executed. Computer system 900 includes a processor, memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

This disclosure contemplates the computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example, and not by way of limitation, one or more computer systems 900 may perform in real time or in batch mode one or more steps of one or more methods described or illustrated herein. One or more computer systems 900 may perform at various times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 900. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Figure 10:
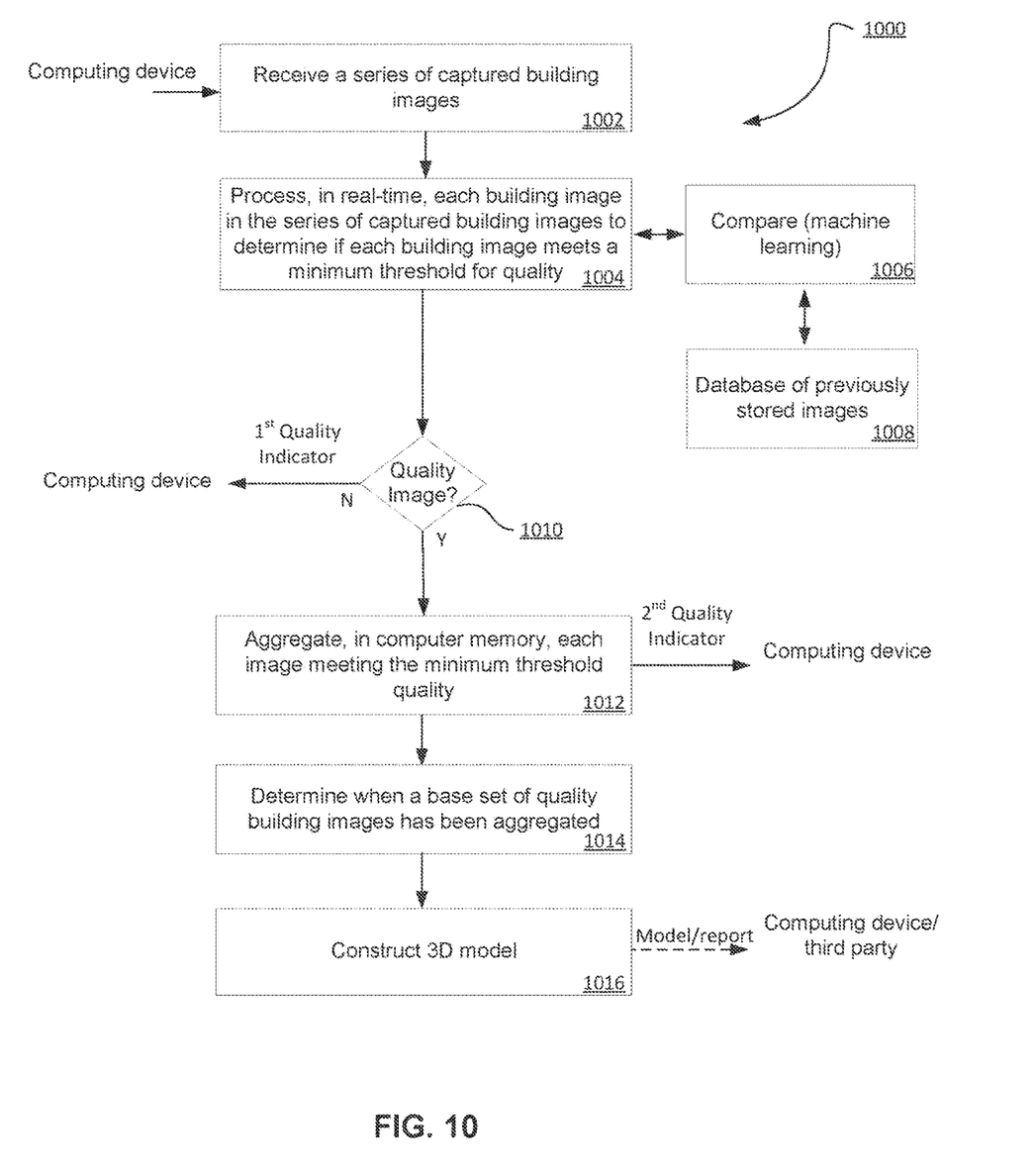
FIG. 10 illustrates a diagram of capturing quality ground-level images of a building object in accordance with the present disclosure.

FIG. 10 illustrates one embodiment 1000 of processing a series of perspective pictures (ground-level images), for example, of a building, usable in a multi-dimensional model construct. A user of the present application technology may be capturing images of a building (e.g., while walking around the building structure taking pictures using a smartphone) but may not fully understand what images are useful (e.g., applicability to model construction or visual quality) to complete rendering (construction) of an associated 3D building model. For example, some building images, like a high-quality image of a building corner with two associated sides may be very useful (e.g., a single image providing corners, heights and lengths of associated building facades) in constructing a multi-dimensional model. While other images may have little or no use for constructing a multi-dimensional building model (e.g., taken at a sharp angle relative to a façade, including blocked façade features, include only secondary unattached structures, etc.), may be duplicative, or may be of low visual image quality (e.g., poor lighting, poor resolution, blurred, include obstructions, out of frame, etc.).

In yet another quality example, a 3D building model construction, including all windows, would require a minimum number of images capturing every window. Therefore, image quality includes, but is not limited to, predetermined acceptable camera-based parameters (e.g., lighting, resolution, distance, movement, angle, etc.), an image's applicability in constructing a multi-dimensional model (e.g., on a scale from very useful to not useful), as well as an image's ability to capture specific architectural features to be included in the model construct. In the various embodiments described in association with FIG. 10, a user can receive real-time feedback on quality levels of building imagery. In addition, the user may receive real-time feedback reflective of the quality and/or actions to take in response to a specific quality indication. For example, a user may receive feedback such as, try again, move to a specific location, move to a perspective relative to one or more facades of the building object, capture a specific facade or architectural feature (e.g., all windows on subject building), consider lighting settings on the camera device, image capture complete, etc.

In step 1002, a series of captured building images are received by a computing device. Typically, these captured images reflect camera imagery taken at various angles and distances from a building object.

In step 1004, each building image in the series of captured building images is processed in real-time to determine if each building image meets a minimum quality threshold, where the minimum quality threshold includes applicability for constructing a multi-dimensional building model. A minimum quality threshold can be fixed or adjustable by an image processing system as images are received and processed. For example, to produce a 3D building model needing only a rough estimate of basic floor square footage, the system would define a minimum quality threshold that captures an outline of the building (e.g., a corner and two associated sides). This image would be processed as a rectified box with width, length and height reflective of the two sides. While an image processing system constructing a 3D building model with exact or near exact architectural feature details may set a high minimum threshold for quality (i.e., an image of every corner and side from multiple angles and distances).

Building images meeting the minimum threshold for quality are identified using a database of previously stored images 1008 and operatively connected machine learning systems/algorithms 1006. For example, machine learning techniques can include, but are not limited to, trained neural networks, deep learning modules, artificial intelligence modules, or machine learning modules. These systems can identify quality by comparing to known quality rated images (i.e., visual quality, applicability in constructing the multi-dimensional building model, and/or applicability in capturing specific architectural features (image is determined to include an entire façade with one or more instances of desired architectural feature)).

In step, 1010, if the image does not meet the minimum threshold for quality, a first indicator is returned to the computing device (and the image discarded). For example, the first indicator could be specific instructions (visual or audible) indicating bad or unacceptable quality or instructions to capture additional building images. However, if the image does meet the minimum threshold for quality, a second indicator is returned to the computing device. For example, the second indicator could be specific instructions indicating good or acceptable quality (e.g., best available), move to next camera position, base set of quality images captured, etc. In one embodiment, the quality indicator is provided as a grade between a low and high number ranking from bad to good.

In step 1012, each of building images meeting the minimum quality threshold is aggregated (e.g., stored as a designated building file in computer memory).

In step 1014, it is determined when a base set of quality building images has been aggregated (e.g., ranging from a single image of a corner and associated two sides to a set of building imagery capturing all corners and sides of the subject building). A base set of quality building images includes a threshold number quality images to model at least a partial multi-dimensional building model representing the series of captured building images. For example, a very rudimentary base 3D building model (basic box) could be constructed using a single image of a corner and both associated sides. While this partial model (i.e., not including all façade features) is incomplete, it can be utilized to create a basic model and would therefore constitute a quality base set for this specific purpose.

In step 1016, when the base set of quality images has been processed (or all images received have been processed), a multi-dimensional building model (e.g., 3D) is constructed and optionally returned to the computing device or a separate third party (estimator).

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the technology as described herein have been expressly described herein, other combinations of these features and functions are likewise possible. For example, the steps may be completed in varied sequences to complete the building image captures. The technology as described herein is not limited by the particular examples disclosed herein and expressly incorporates these other combinations. It is noted that terminologies as may be used herein have been used interchangeably to describe digital information whose content corresponds to any of a number of desired types (e.g., image, video, text, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The invention claimed is:

1. A method of processing building imagery, the method comprises:
    processing, in real-time, each building image in a series of captured building images to determine if the building image meets a minimum threshold for quality;
    for each building image meeting the minimum threshold for quality, storing this building image in computer memory;
    determining when a complete set of quality building images has been received, wherein the complete set of quality building images includes a minimum grouping of images to construct at least a partial multi-dimensional building model representing the series of captured building images, where the at least a partial multi-dimensional building model includes surfaces shown in the minimum grouping of images.

2. The method of claim 1, further comprising receiving the series of captured building images.

3. The method of claim 1, further comprising:
    for each building image meeting the minimum threshold for quality, returning a first quality indication to a computing device.

4. The method of claim 1, further comprising:
    for each building image not meeting the minimum threshold for quality, discarding this building image.

5. The method of claim 4, further comprising:
    for each building image not meeting the minimum threshold for quality, returning a second quality indication to a computing device.

6. The method of claim 1, wherein the processing includes comparing each captured building image in the series of captured building images to a database of previously stored quality images.

7. The method of claim 1, wherein the minimum threshold for quality includes any of: predetermined acceptable camera-based image parameters, applicability in constructing a multi-dimensional, or capturing instances of specific architectural features to be included in model construction.

8. The method of claim 1, wherein the minimum threshold for quality includes capturing at least a first corner and one or more sides of a corresponding building.

9. The method of claim 1, wherein the minimum threshold for quality includes capturing all instances of at least a first architectural feature for a corresponding building.

10. The method of claim 1, wherein the minimum threshold for quality includes capturing a specific perspective of a corresponding building.

11. One or more non-transitory computer-readable media storing instructions that, when executed by a system comprising one or more processors, cause the one or more processors to perform operations comprising:
    processing, in real-time, each building image in a series of captured building images to determine if the building image meets a minimum threshold for quality;
    for each building image meeting the minimum threshold for quality, storing this building image in computer memory;
    determining when a complete set of quality building images has been received, wherein the complete set of quality building images includes a minimum grouping of images to construct at least a partial multi-dimensional building model representing the series of captured building images, where the at least a partial multi-dimensional building model includes surfaces shown in the minimum grouping of images.

12. The one or more non-transitory computer-readable media of claim 11, further comprising receiving the series of captured building images.

13. The one or more non-transitory computer-readable media of claim 11, further comprising:
for each building image meeting the minimum threshold for quality, returning a first quality indication to a computing device.

14. The one or more non-transitory computer-readable media of claim 11, further comprising:
for each building image not meeting the minimum threshold for quality, discarding this building image.

15. The one or more non-transitory computer-readable media of claim 14, further comprising:
for each building image not meeting the minimum threshold for quality, returning a second quality indication to a computing device.

16. The one or more non-transitory computer-readable media of claim 11, wherein the processing includes comparing each captured building image in the series of captured building images to a database of previously stored quality images.

17. The one or more non-transitory computer-readable media of claim 11, wherein the minimum threshold for quality includes any of: predetermined acceptable camera-based image parameters, applicability in constructing a multi-dimensional, or capturing instances of specific architectural features to be included in model construction.

18. The one or more non-transitory computer-readable media of claim 11, wherein the minimum threshold for quality includes capturing at least a first corner and one or more sides of a corresponding building.

19. The one or more non-transitory computer-readable media of claim 11, wherein the minimum threshold for quality includes capturing all instances of at least a first architectural feature for a corresponding building.

20. The one or more non-transitory computer-readable media of claim 11, wherein the minimum threshold for quality includes capturing a specific perspective of a corresponding building.

* * * * *